(12) United States Patent
Oikawa

(10) Patent No.: US 12,034,386 B2
(45) Date of Patent: Jul. 9, 2024

(54) VIBRATION TYPE MOTOR, LENS APPARATUS, AND ELECTRONIC APPARATUS

(71) Applicant: CANON KABUSHIKI KAISHA, Tokyo (JP)

(72) Inventor: Makoto Oikawa, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 815 days.

(21) Appl. No.: 17/178,135

(22) Filed: Feb. 17, 2021

(65) Prior Publication Data

US 2021/0257937 A1 Aug. 19, 2021

(30) Foreign Application Priority Data

Feb. 19, 2020 (JP) .................. 2020-025973

(51) Int. Cl.
*H02N 2/02* (2006.01)
*G02B 7/02* (2021.01)
*H02N 2/00* (2006.01)

(52) U.S. Cl.
CPC ............ *H02N 2/026* (2013.01); *G02B 7/02* (2013.01); *H02N 2/0065* (2013.01)

(58) Field of Classification Search
CPC .... H02N 2/188; H02N 2/181; H10N 30/1061; H10N 30/802; H10N 30/306; H10N 30/852
USPC ....................... 310/323.01–323.21
See application file for complete search history.

(56) References Cited

U.S. PATENT DOCUMENTS

| | | | | |
|---|---|---|---|---|
| 2003/0201695 | A1* | 10/2003 | Funakubo | H10N 30/2023 310/323.01 |
| 2008/0036333 | A1* | 2/2008 | Funakubo | H02N 2/026 310/323.02 |
| 2011/0227453 | A1* | 9/2011 | Araki | H02N 2/0015 310/323.02 |
| 2011/0227454 | A1* | 9/2011 | Araki | H02N 2/026 29/25.35 |
| 2012/0274180 | A1* | 11/2012 | Araki | H02N 2/0065 310/323.01 |

(Continued)

FOREIGN PATENT DOCUMENTS

JP 2018-148626 A 9/2018

*Primary Examiner* — Derek J Rosenau
(74) *Attorney, Agent, or Firm* — Cowan, Liebowitz & Latman, P.C.

(57) ABSTRACT

A vibration type motor includes a vibration plate configured to vibrate by a piezoelectric element, a friction member including a contact surface for the vibration plate, and configured to move relative to the vibration plate as the vibration plate vibrates, and an adhesive member provided on the contact surface of the friction member. The vibration plate includes a protrusion that protrudes toward a side opposite to the piezoelectric element. The protrusion includes a sidewall portion, at least one contact portion that contacts the contact surface, and a flat portion provided between the contact portion and the sidewall portion. The adhesive member has an opening that avoids a moving range of the contact portion. The opening in the adhesive member is located outside the sidewall portion. An end of the adhesive member is located outside the friction member.

9 Claims, 6 Drawing Sheets

(56) References Cited

U.S. PATENT DOCUMENTS

2015/0155798 A1\* 6/2015 Kimura ................ H02N 2/001
310/323.02

\* cited by examiner

VIBRATION TYPE MOTOR, LENS APPARATUS, AND ELECTRONIC APPARATUS

BACKGROUND OF THE INVENTION

Field of the Invention

The present invention relates to a vibration type motor usable for a lens apparatus, etc.

Description of the Related Art

The vibration type motors are structured so that a contact portion of an elastic body onto which a piezoelectric element is fixed and a friction member are in a pressure contact state. When a two-phase voltage is applied to the piezoelectric element under such a pressure contact state and the two-phase ultrasonic vibration is excited to the elastic body, an elliptical motion occurs at the contact portion of the elastic body and the friction member moves relative to the elastic body. Since the contact portion of the elastic body and the friction member frictionally slide on each other, abrasive powder (wear debris) is generated. Japanese Patent Laid-Open No. ("JP") 2018-148626 discloses a vibration type motor in which an adhesive agent for fixing a friction member is adhesive and absorbs abrasive powder.

However, the vibration type motor disclosed in JP 2018-148626 cannot sufficiently adsorb the abrasive powder. That is, in the vibration type motor disclosed in JP 2018-148626, the adhesive agent for adsorbing the abrasive powder is disposed outside the friction member and distant from the contact portion of the elastic body which is the source of the abrasive powder. The adhesive agent for absorbing the abrasive powder is as high as the sliding surface of the friction member, and the abrasive powder is highly likely to leak out of the vibration type motor beyond the adhesive agent.

SUMMARY OF THE INVENTION

The present invention provides a vibration type motor, a lens apparatus, and an electronic apparatus, in which abrasive powder is less likely to leak out.

A vibration type motor according to one aspect of the present invention includes a vibration plate configured to vibrate by a piezoelectric element, a friction member including a contact surface for the vibration plate, and configured to move relative to the vibration plate as the vibration plate vibrates, and an adhesive member provided on the contact surface of the friction member. The vibration plate includes a protrusion that protrudes toward a side opposite to the piezoelectric element. The protrusion includes a sidewall portion, at least one contact portion that contacts the contact surface, and a flat portion provided between the contact portion and the sidewall portion. The adhesive member has an opening that avoids a moving range of the contact portion. The opening in the adhesive member is located outside the sidewall portion. An end of the adhesive member is located outside the friction member.

A lens apparatus and an electronic apparatus each having the above vibration type motor also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

In FIGS. 1 to 5, a relative movement direction between a vibrator 104 and a friction member 101 will be defined as an X axis, a pressure directions in which the vibrator 104 and the friction member 101 are in a pressure contact by a spring 110 described later will be defined as a Z axis, and a direction orthogonal to each of the X and Z axes will be defined as a Y axis.

Figure 1:
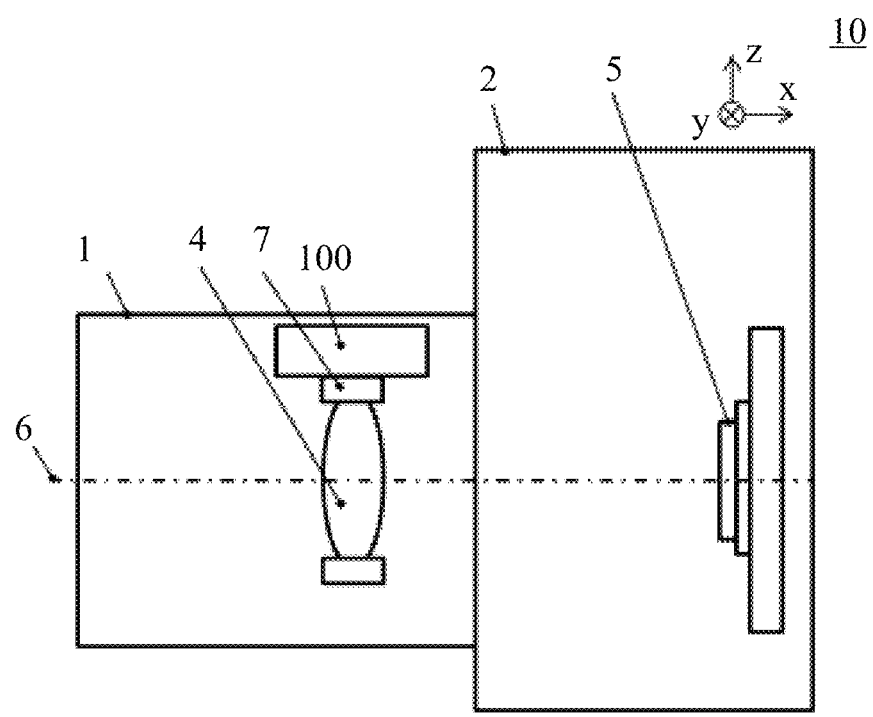
FIG. 1 is a structural diagram of an image pickup apparatus according to this embodiment.

Referring now to FIG. 1, a description will be given of an image pickup apparatus 10 according to this embodiment. FIG. 1 is a structural diagram of the image pickup apparatus 10. The image pickup apparatus 10 includes a lens apparatus 1 provided with a vibration type motor (ultrasonic motor) 100, and a camera body 2 integrated with the lens apparatus 1. However, this embodiment is not limited to this example, and is applicable to an image pickup apparatus (imaging system) configured to include a camera body and a lens apparatus (interchangeable lens) that is attachable to and detachable from the camera body.

Inside the lens apparatus 1, a focus lens (optical system) 4 is held by a lens holder 7. The lens holder 7 and the vibration type motor 100 are connected to each other, and the focus lens 4 and the lens holder 7 can move in a direction substantially parallel to an optical axis 6 as the vibrator constituting the vibration type motor 100 moves. During imaging, the focus lens 4 and the lens holder 7 move in the direction substantially parallel to the optical axis 6, and an object image is captured at the position of an image sensor 5 such as a CMOS sensor to generate an in-focus image.

Figure 2:
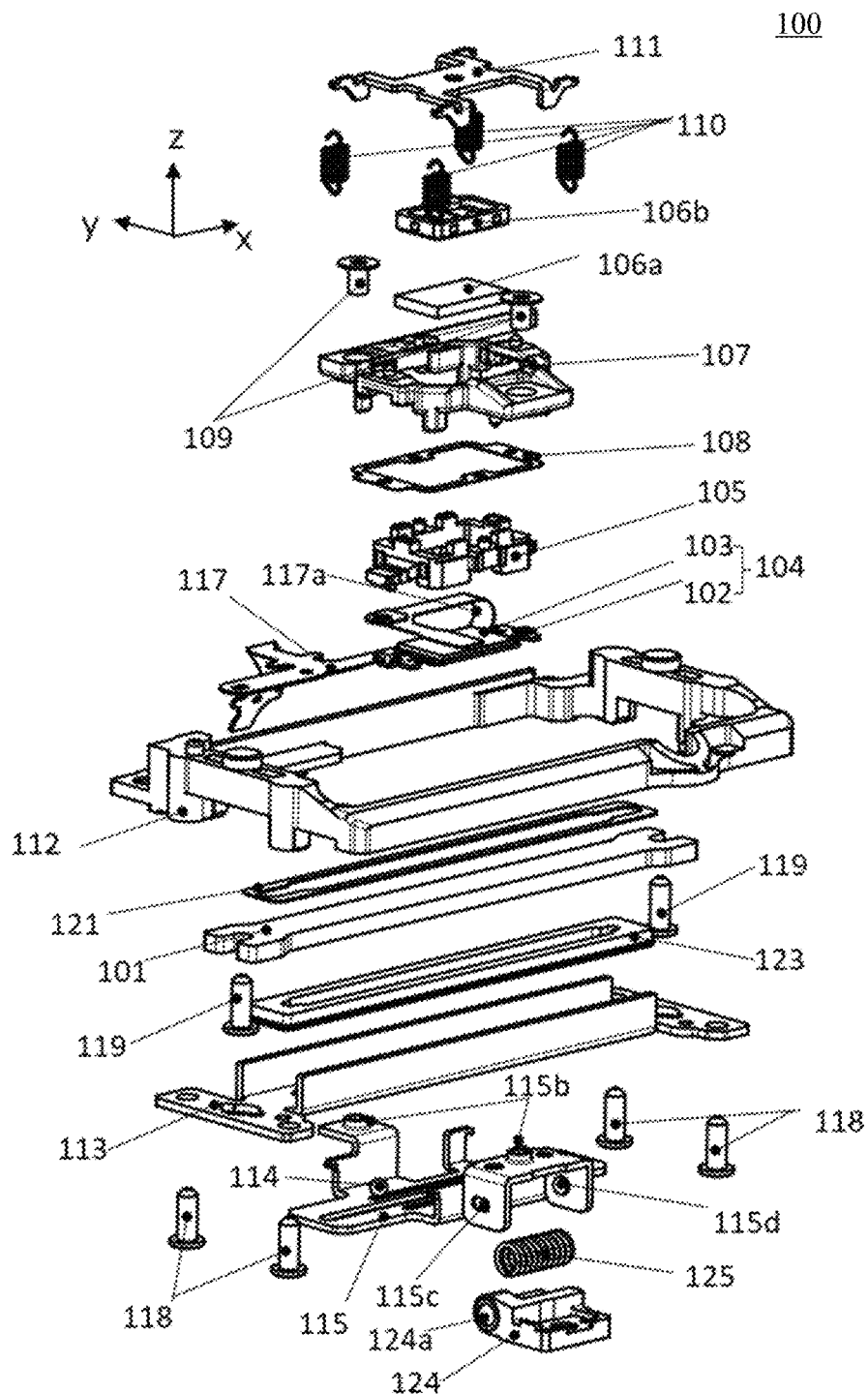
FIG. 2 is a developed view of a vibration type motor according to this embodiment.

Referring now to FIG. 2, a description will be given of the vibration type motor 100 according to this embodiment. FIG. 2 is a developed view of the vibration type motor 100. The vibration type motor 100 in this embodiment includes each member described below.

The vibrator 104 includes a vibration plate 102 and a piezoelectric element 103, which form a vibrating pair having elasticity. The vibration plate 102 vibrates by the piezoelectric element 103. The vibration plate 102 and the piezoelectric element 103 are fixed to each other by a known adhesive agent or the like. Flexible printed circuits (FPC) (substrate or board) 117 is pressed and fixed to the piezoelectric element 103, and ultrasonic vibration is excited to the vibrator 104 by applying a high-frequency voltage to the piezoelectric element 103 via the FPC 117. The FPC 117 has a U-turn portion 117a. As the vibrator 104 moves in the x direction, the U-turn portion 117a moves by half the moving amount. Thus, the U-turn portion 117a provided between the fixed portion and the movable portion of the FPC 117 can prevent the load from being applied to the vibrator 104 by the stiffness of the FPC 117 even when the vibrator 104 moves in the x direction.

The vibrator 104 and a first holder 105 are fixed by a known adhesive agent or the like. The first holder 105 is connected to a second holder 107 via a thin plate member 108. The thin plate member 108 is less rigid against a force in the z direction and is deformable relatively freely. On the other hand, the thin plate member 108 characteristically is highly rigid against a force in the xy direction and is not easily deformed. By connecting the first holder 105 and the second holder 107 to each other via the thin plate member 108 having such characteristics, the first holder 105 and the second holder 107 can be comparatively freely moved relative to each other in the z direction, and positioned without play in the xy direction. Thereby, the vibrator 104 can be steadily held relative to the second holder 107 in the x direction while the pressure of the spring 110 is steadily transmitted to the vibrator 104.

The rigidity of the thin plate member 108 in the X direction is set high enough not to get substantially deformed by the inertial force due to the acceleration and deceleration generated when the vibrator 104 starts and stops driving. Thereby, a driving control can be stabilized between the vibrator 104 and the second holder 107 without causing any relative displacements in the moving direction due to the inertial force during driving.

The springs 110 connect biasing members 111 and movable guide members 115 at four locations, and bring the vibrator 104 into pressure contact with the friction member 101 by the pressures of the plurality of springs 110. Reference numeral 106a denotes a buffer member, and reference numeral 106b denotes a base plate to which the buffer member 106a is bonded. The buffer member 106a and the base plate 106b are disposed between the piezoelectric element 103 and the biasing member 111. The buffer member 106a and the base plate 106b prevent the biasing member 111 and the piezoelectric element 103 from directly contacting each other, and prevent the piezoelectric element 103 from getting damaged. The second holder 107 and the movable guide member 115 are fixed with screws 109. Reference numeral 115b denotes a threaded portion provided on the movable guide member 115. In this embodiment, the second holder 107 and the movable guide member 115 are fixed by the screws 109, but the fixing method is not limited to this example.

The fixed guide member 113 is a guide member that guides the relative movement of the friction member 101 that moves in the X direction relative to the vibrator 104. The friction member 101 is fixed to the base member 112 by screws 119, and the fixed guide member 113 is fixed to the base member 112 by screws 118. Reference numeral 114 denotes a ball that rolls between the fixed guide member 113 and the movable guide member 115.

Reference numeral 124 denotes a connector that connects the lens holder 7 and the movable guide member 115 described with reference to FIG. 1. A biasing spring 125 is provided between the connector 124 and a protrusion 115d of the movable guide member 115, and presses a spherical portion 124a of the connector 124 against a slot portion 115c of the movable guide member 115. Due to this connecting configuration, the movable guide member 115 and the connector 124 are connected without play in the x and z directions while relative movements in the y direction and rotations around the x axis, y axis, and z axis are allowed. In this embodiment, there may be a shift between a linear guide of the lens holder 7 and a linear guide in the vibration type motor 100 determined by the movable guide member 115 and the fixed guide member 113. Even in this case, the above structure can absorb the relative movement between the movable guide member 115 and the connector 124 in the y and z directions as the lens holder 7 moves in the x direction.

Reference numeral 121 denotes an adhesive member 121 for adsorbing abrasive powder generated by sliding friction between the friction member 101 and the vibrator 104. The adhesive member 121 is adhesive on its surface, and has a structure that easily adsorbs the abrasive powder. The adhesive member 121 is bonded to the friction member 101 (provided on a sliding surface 101a of the friction member 101). Reference numeral 123 denotes a damper for damping the vibration of the friction member 101. The damper 123 is bonded to the surface of the fixed guide member 113 on the side of the friction member 101, and is held in a crushed state between the friction member 101 and the fixed guide member 113.

Referring now to FIGS. 3A to 3D, a description will be given of a structure and effects of principal part of the vibration type motor 100. FIGS. 3A to 3D are structural diagrams of the vibration type motor 100.

Figure 3A:
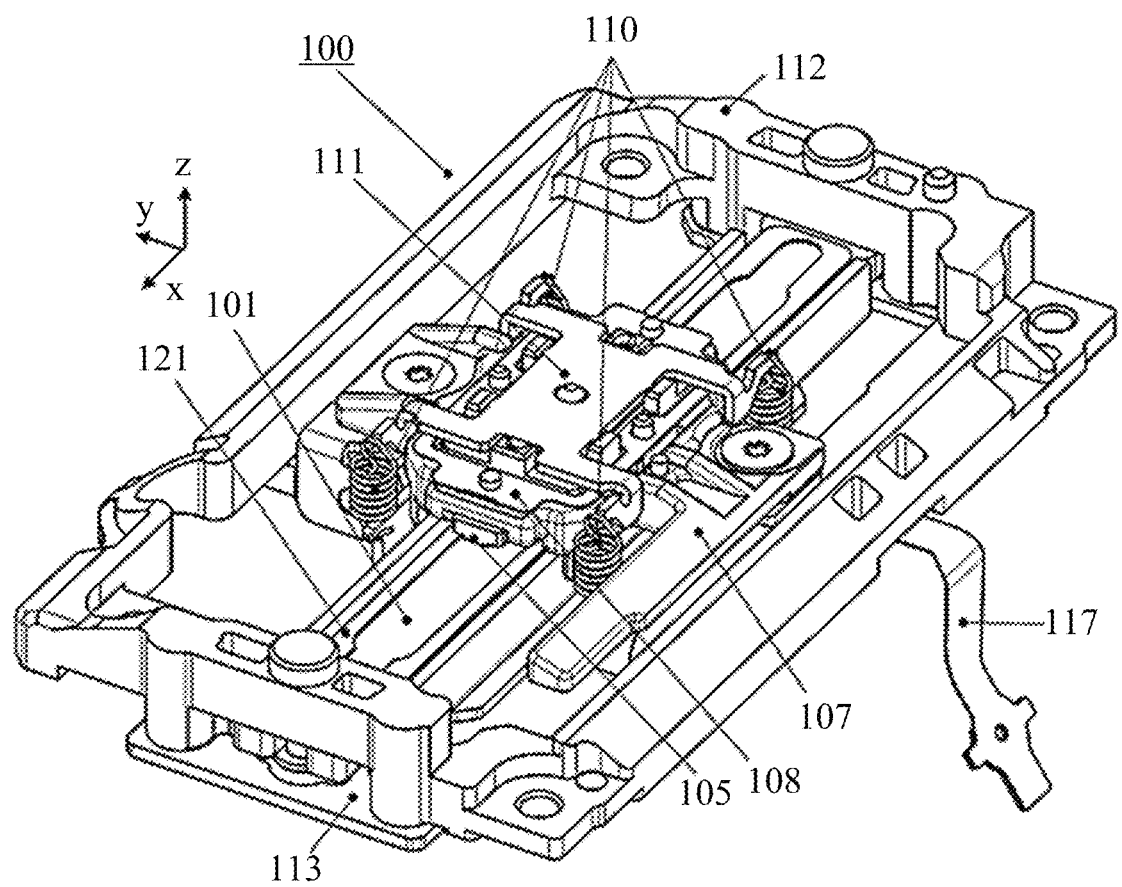
FIGS. 3A to 3D are structural diagrams of the vibration type motor according to this embodiment.

FIG. 3A is a perspective view of the vibration type motor 100. Reference numeral 111 denotes a biasing member 111, and springs 110 are engaged with it at four locations. The first holder 105 holding the vibrator 104 is connected to the second holder 107 via the thin plate member 108. An adhesive member 121 that is adhesive is bonded to the friction member 101, and is configured to adsorb abrasive powder generated by sliding friction between the friction member 101 and the vibrator 104. The vibration type motor 100 is a so-called vibrator movable type vibration type motor, in which the friction member 101 is fixed, and the vibrator 104, the first holder 105, the second holder 107, the thin plate member 108, the spring 110, and the biasing member 111 move in the x direction, respectively.

Figure 3B:
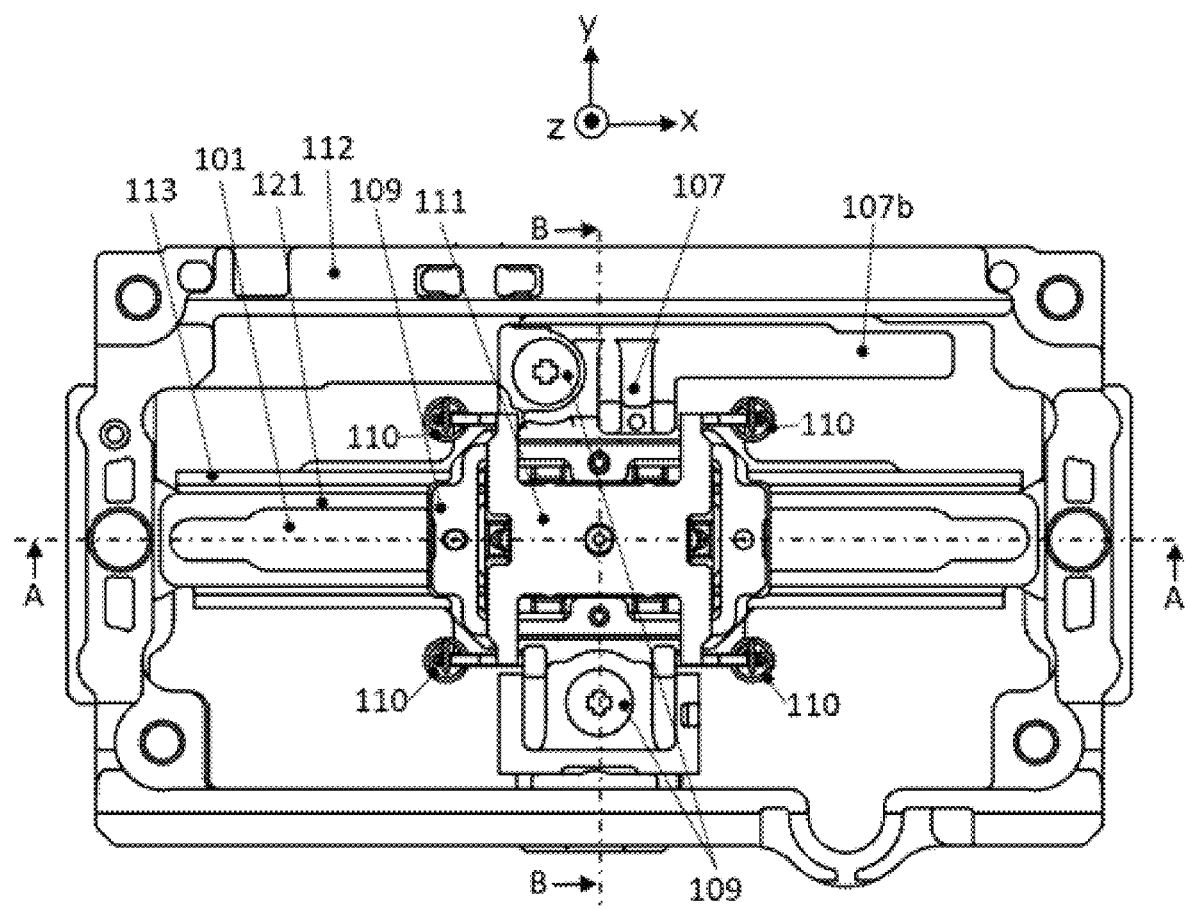
Figure 3C:
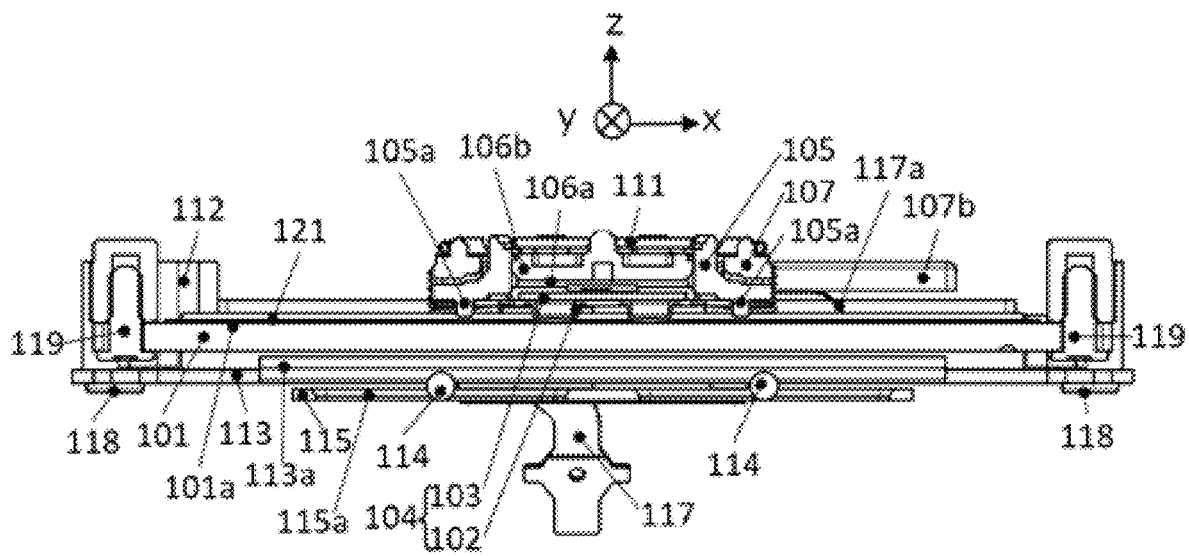

FIG. 3B illustrates the vibration type motor 100 viewed from the +Z direction. A line A-A corresponds to a center position of the friction member 101 in the y direction, and A line B-B corresponds to a center position of the friction member 101 in the x direction. FIG. 3C is a sectional view taken along the line A-A in FIG. 3B. The movable guide member 115 is formed with a groove portion 115a for guiding rolling of the ball 114 in the X direction. Reference numeral 113 denotes a fixed guide member. The fixed guide member 113 has a guide groove portion 113a that guides rolling of the ball 114 in the X direction. When the ball 114 rolls while being sandwiched between the guide groove portion 113a and the groove portion 115a by the pressure of the spring 110, the movable guide member 115 can linearly move in the X direction while maintaining a low load applied to the fixed guide member 113.

Reference numeral 112 denotes a base member that holds the fixed guide member 113 and the friction member 101. The fixing guide member 113 is fixed to the base member 112 with screws 118. The friction member 101 is disposed in the +Z direction of the fixed guide member 113. Reference numeral 105 denotes the first holder, and reference numeral 117 denotes the FPC. The first holder 105 is fixed to the vibrator 104 via a fixed portion 105a. The FPC 117 has a U-turn portion 117a in which the FPC 117 extending in the +X direction is folded back in the −X direction. The second holder 107 receives a bending reaction force from the flexible substrate 117 generated in the Z direction by the U-turn portion 117a at a U-turn receiver 107b.

In this embodiment, a movable part is formed by integrating the vibrator 104, the first holder 105, the thin plate member 108, the second holder 107, the buffer member 106a, the base plate 106b, the spring 110, the biasing member 111, and the movable guide member 115 with one another. When a driving voltage is applied to the piezoelectric element 103, the movable portion moves in the +X or −X direction relative to the fixed friction member 101 and base member 112.

Figure 3D:
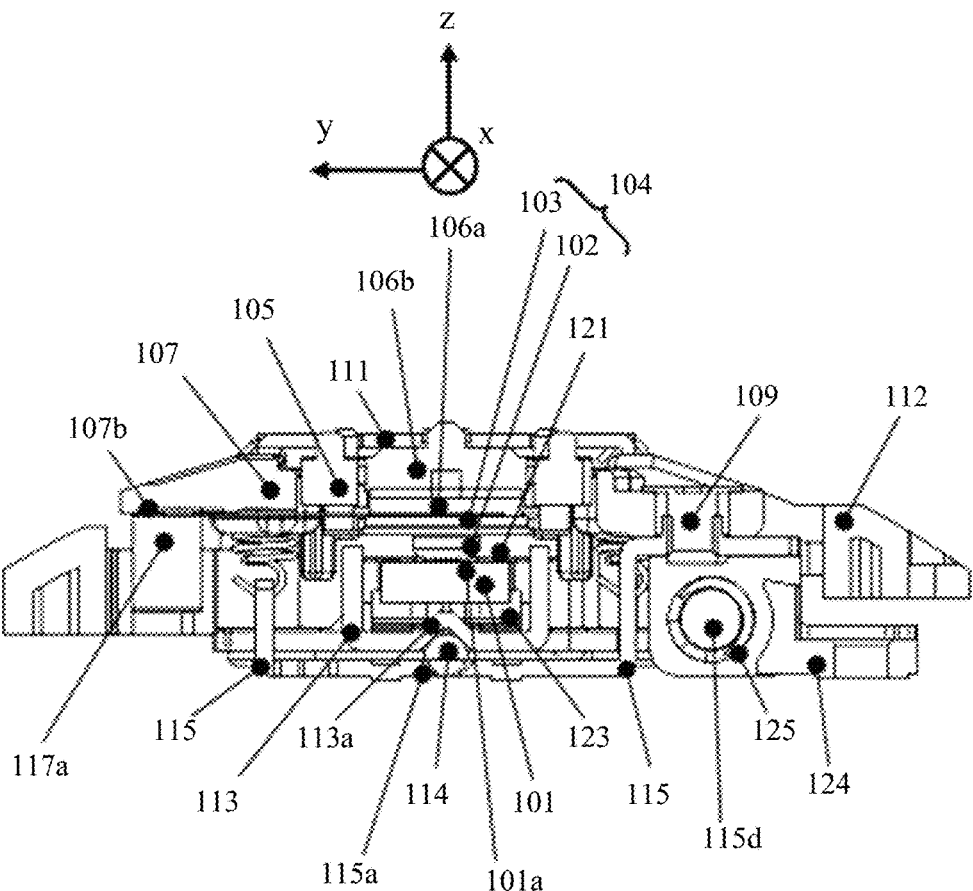

FIG. 3D is a sectional view taken along the line B-B in FIG. 3B. The pressure of the spring 110 is a force that presses the vibrator 104 against the friction member 101 in the Z direction via the base plate 106b and the buffer member 106a. The contact portion 102b of the vibration plate 102 contacts the friction member 101 in a compressed state. The adhesive member 121 that is adhesive is bonded to the sliding surface (contact surface) 101a of the friction member 101. Thereby, the abrasive powder generated by the sliding friction between the vibrator 104 and the friction member 101 can be adsorbed by the adhesive member 121.

The FPC 117 is folded back from the −X direction to the +X direction at the U-turn portion 117a. Since the FPC 117 is folded back at the U-turn portion 117a, a folding reaction force is generated in the Z direction. The second holder 107 has the U-turn receiver 107b for receiving the folded reaction force. When the FPC 117 contacts the U-turn receiver 107b, the U-turn portion 117a can maintain a shape of folding back from the −X direction to the +X direction. The movable guide member 115 includes the protrusion 115d and holds a biasing spring 125. The movable guide member 115 is connected to the connector 124 while being biased in the x direction by the biasing spring 125.

Figure 4:
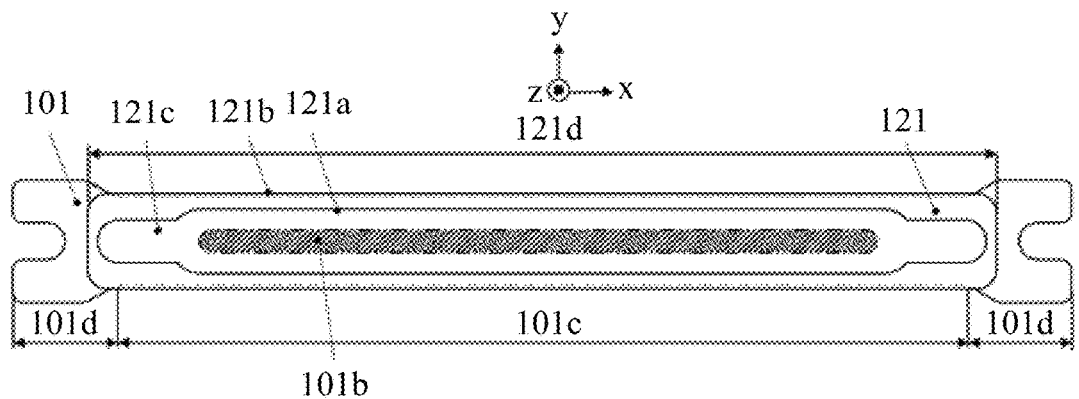
FIG. 4 is an explanatory diagram of a relationship between an adhesive member and a friction member in this embodiment.

Referring now to FIG. 4, a description will be given of a relationship between the adhesive member 121 and the friction member 101. FIG. 4 is an explanatory diagram of the relationship between the adhesive member 121 and the friction member 101.

Reference numeral 101b denotes a moving range (relative movement range) of the contact portion 102b of the vibration plate 102. In this embodiment, the vibration plate 102 has only one contact portion 102b, but may have a plurality of contact portions. The adhesive member 121 has an opening 121a that avoids the moving range 101b of the contact portion 102b. By surrounding the moving range 101b of the contact portion 102b with the adhesive member 121, the abrasive powder generated by the sliding friction between the friction member 101 and the contact portion 102b is likely to stay inside the opening 121a. Thereby, the abrasive powder can be prevented from leaking out of the vibration type motor 100. Notches 121c are formed at both ends of the opening 121a in the x direction. Thereby, it is possible to prevent the fixed portion 105a from contacting the adhesive member 121.

The friction member 101 moves relative to the vibration plate 102 due to the vibration of the vibration plate 102. In this embodiment, the ultrasonic vibration is excited to the vibration plate 102 by the piezoelectric element 103, and the friction member 101 moves relative to the vibration plate 102 by the ultrasonic vibration. The friction member 101 is narrow in the y direction in the area of the moving range 101b of the contact portion 102b, and this area will be referred to as a first area 101c. It is necessary to provide a restrictor 113b to the first area 101c, which will be described later with reference to FIG. 5, outside the friction member 101 in the y direction. Therefore, the first area 101c is narrow in the y direction.

A second area 101d that is wide in the y direction is formed at both ends of the first area 101c in the x direction. The friction member 101 is fixed to the base member 112 in the second area 101d. It is thus necessary to form a fixed hole in the second area 101d, and the second area 101d is wider than the first area 101c in the y direction.

Since the first area 101c is narrow in the y direction, the first area 101c is less rigid than the second area 101d. Therefore, the resonance vibration is likely to occur due to the vibration of the vibrator 104. Since the friction member 101 is made of metal and the adhesive member 121 is made of double-sided tape made of a resin base material, the adhesive member 121 has a higher damping property than that of the friction member 101. Accordingly, the resonance vibration can be suppressed by bonding the adhesive member 121 having a high damping property to the first area 101c.

Reference numeral 121d denotes a length of the adhesive member 121 in the X direction. The length 121d in the X direction is longer than the first area 101c. In the vibration type motor 100 according to this embodiment, the adhesive member 121 is made larger than the first area 101c so as to make higher the damping property of the first area 101c where the resonance vibration is likely to occur and to suppress the resonance vibration.

Figure 5:
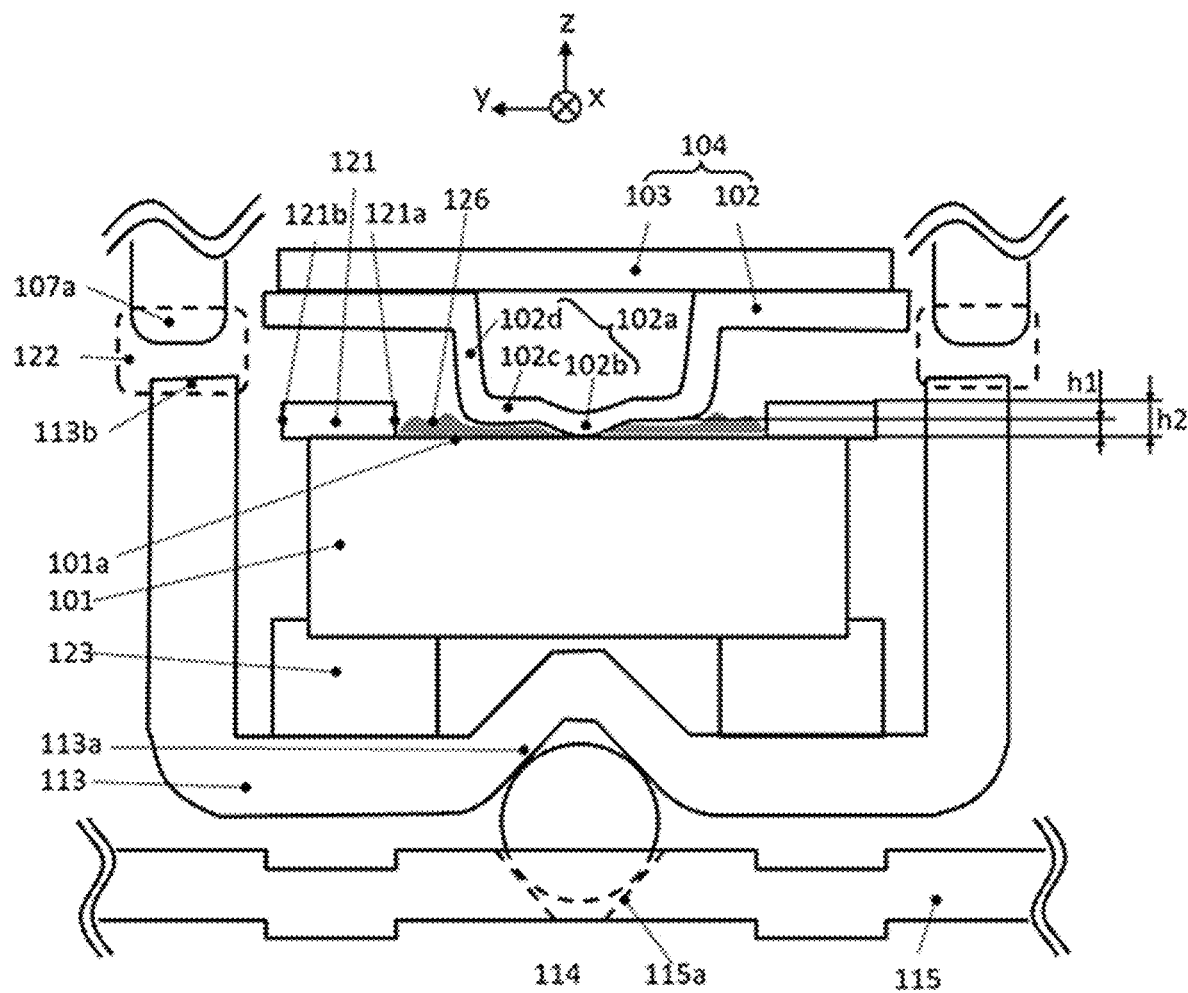
FIG. 5 is an explanatory diagram of the relationship between the adhesive member, a vibration plate, and a restriction mechanism in this embodiment.

Referring now to FIG. 5, a description will be given of a relationship between the adhesive member 121, the vibration plate 102, and a restriction mechanism 122. FIG. 5 is an explanatory diagram of the relationship between the adhesive member 121, the vibration plate 102, and the restriction mechanism 122.

First, part of the vibration plate 102 will be described. The vibration plate 102 includes a protrusion 102a that protrudes in the −z direction on the opposite side of the piezoelectric element 103. The protrusion 102a includes a contact portion 102b, a flat portion 102c, and a sidewall portion 102d. The contact portion 102b contacts the sliding surface 101a of the friction member 101. The flat portion 102c is formed between the contact portion 102b and the sidewall portion 102d.

Reference numeral 126 denotes abrasive powder generated by the sliding friction between the sliding surface 101a of the friction member 101 and the contact portion 102b of the vibration plate 102. The abrasive powder 126 is generated at the contact portion 102b, passes between the sliding surface 101a and the flat portion 102c, and would otherwise leak out. Since the abrasive powder 126 would leak out while its height is restrained in the z direction to some extent in passing between the sliding surface 101a and the flat portion 102c, it is substantially as high as the height from the sliding surface 101a to the flat portion 102c.

Reference numeral 121 denotes the adhesive member (adsorption sheet or the like) that is adhesive on the surface. Reference numeral 121a denotes an opening for avoiding the moving range 101b of the contact portion 102b. The contact portion 102b is surrounded by the opening 121a. Therefore, the abrasive powder 126 generated by the sliding friction between the friction member 101 and the contact portion 102b is likely to stay inside the opening 121a. The height of the adhesive member 121 is set thicker than the height from the sliding surface 101a to the flat portion 102c. The adhesive member 121 in the z direction is higher than the abrasive powder 126 that has come out between the sliding surface 101a and the flat portion 102c. Therefore, the abrasive powder 126 is less likely to go beyond the adhesive member 121 and leak out of the vibration type motor 100.

Reference numeral 107a denotes a contact portion 107a provided on the second holder 107. Reference numeral 113b is the restrictor provided on the fixed guide member 113. The contact portion 107a and the restrictor 113b constitute the restriction mechanism 122 that restricts the vibration plate 102 from moving toward the friction member 101. The restriction mechanism 122 is provided outside the vibration plate 102. A predetermined gap amount is provided between the contact portion 107a and the restrictor 113b. When the vibration plate 102 tries to move toward the friction member 101 beyond the predetermined gap amount, the contact portion 107a and the restrictor 113b come into contact with each other so that the vibration plate 102 does not come closer to the friction member 101 any longer. This structure can prevent the vibration plate 102 from getting excessively close to the friction member 101 due to an impact or the like, the vibrator 104 and the thin plate member 108 from getting damaged, and the ball 114 from falling off from a space between the guide groove portion 113a and the groove portion 115a.

The opening 121a in the adhesive member 121 is located outside the sidewall portion 102d of the vibration plate 102. An end 121b of the adhesive member 121 is located inside the restriction mechanism 122. The vibration plate 102 has a shape in which the protrusion 102a protrudes toward the friction member 101. Therefore, there is no component in a space sandwiched between the friction member 101 and the vibration plate 102 in the z direction and between the sidewall portion 102d and the restriction mechanism 122 in the y direction, and the space is empty. Accordingly, in the vibration type motor 100 according to this embodiment, the adhesive member 121 is disposed in the area sandwiched between the sidewall portion 102d and the restriction mechanism 122, so as to maximize the empty space and to absorb the abrasive powder 126 without increasing the size of the vibration type motor 100.

The end 121b of the adhesive member 121 is formed outside the friction member 101. Thereby, it is possible to reduce the amount of abrasive powder entering the gap between the friction member 101 and the fixed guide member 113. Further, the abrasive powder 126 that has entered the gap between the friction member 101 and the fixed guide member 113 is less likely to leak out.

As described above with reference to FIGS. 1 to 5, the vibration type motor 100 according to this embodiment includes the adhesive member 121 that is adhesive on the sliding surface 101a of the friction member 101. The adhesive member 121 has an opening shape that surrounds the moving range 101b of the contact portion 102b, and the end 121b is formed outside the friction member 101. Thereby, it is possible to realize the vibration type motor 100 in which abrasive powder is less likely to leak out.

This embodiment drives the focus lens 4 as a driven member using the vibration type motor 100, but the driven member may be set to an element other than the optical system (at least part of the imaging optical system such as the focus lens 4) in the image pickup apparatus 10. For example, the image sensor may be set to the driven member, and the vibration type motor 100 may be used to drive the image sensor 5 in a direction orthogonal to the optical axis 6 of the imaging optical system. The electronic apparatus to which the present invention is applicable is not limited to the image pickup apparatus 10, and the component in the electronic apparatus other than the image pickup apparatus 10 may be used as a driven member, and the vibration type motor 100 may be used to drive the driven member.

This embodiment can provide a vibration type motor, a lens apparatus, and an electronic apparatus, in which abrasive powder is less likely to leak out.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-025973, filed on Feb. 19, 2020 which is hereby incorporated by reference herein in its entirety.

What is claimed is:

1. A vibration type motor comprising:
a vibration plate configured to vibrate by a piezoelectric element;
a friction member including a contact surface for the vibration plate, and configured to move relative to the vibration plate as the vibration plate vibrates; and
an adhesive member provided on the contact surface of the friction member,
wherein the vibration plate includes a protrusion that protrudes toward a side opposite to the piezoelectric element,
wherein the protrusion includes a sidewall portion, at least one contact portion that contacts the contact surface, and a flat portion provided between the contact portion and the sidewall portion,
wherein the adhesive member has an opening that avoids a moving range of the contact portion,
wherein the opening in the adhesive member is located outside the sidewall portion, and
wherein an end of the adhesive member is located outside the friction member.

2. The vibration type motor according to claim 1, further comprising a restriction mechanism provided outside the vibration plate, and configured to restrict the vibration plate from moving toward the friction member,
wherein the end of the adhesive member is provided inside the restriction mechanism.

3. The vibration type motor according to claim 1, wherein while the contact portion contacts the contact surface, the adhesive member is thicker than a length from the contact surface to the flat portion.

4. The vibration type motor according to claim 1, wherein the friction member includes a first area having a narrow width, and a second area having a wide width formed at both ends of the first area, and
wherein the adhesive member is larger than the first area.

5. The vibration type motor according to claim 1, wherein an ultrasonic vibration is excited to the vibration plate by the piezoelectric element, and
wherein the friction member moves relative to the vibration plate by the ultrasonic vibration.

6. The vibration type motor according to claim 1, wherein the contact portion of the vibration plate is surrounded by the opening in the adhesive member.

7. The vibration type motor according to claim 1, wherein the adhesive member adsorbs abrasive powder generated by a sliding friction between the contact surface of the friction member and the contact portion of the vibration plate.

8. A lens apparatus comprising:
a vibration type motor; and
an optical system driven by the vibration type motor,
wherein the vibration type motor includes:
a vibration plate configured to vibrate by a piezoelectric element;

a friction member including a contact surface for the vibration plate, and configured to move relative to the vibration plate as the vibration plate vibrates; and an adhesive member provided on the contact surface of the friction member, wherein the vibration plate includes a protrusion that protrudes toward a side opposite to the piezoelectric element, wherein the protrusion includes a sidewall portion, at least one contact portion that contacts the contact surface, and a flat portion provided between the contact portion and the sidewall portion, wherein the adhesive member has an opening that avoids a moving range of the contact portion, wherein the opening in the adhesive member is located outside the sidewall portion, and wherein an end of the adhesive member is located outside the friction member.

9. An electronic apparatus comprising:

a vibration type motor; and a driven member driven by the vibration type motor, wherein the vibration type motor includes:

a vibration plate configured to vibrate by a piezoelectric element;

a friction member including a contact surface for the vibration plate, and configured to move relative to the vibration plate as the vibration plate vibrates; and an adhesive member provided on the contact surface of the friction member, wherein the vibration plate includes a protrusion that protrudes toward a side opposite to the piezoelectric element, wherein the protrusion includes a sidewall portion, at least one contact portion that contacts the contact surface, and a flat portion provided between the contact portion and the sidewall portion, wherein the adhesive member has an opening that avoids a moving range of the contact portion, wherein the opening in the adhesive member is located outside the sidewall portion, and wherein an end of the adhesive member is located outside the friction member.

\* \* \* \* \*